(12) United States Patent
Soejima

(10) Patent No.: US 11,226,311 B2
(45) Date of Patent: Jan. 18, 2022

(54) ULTRASONIC INSPECTION SYSTEM, ULTRASONIC INSPECTION METHOD AND AIRCRAFT STRUCTURAL OBJECT

(71) Applicant: SUBARU CORPORATION, Tokyo (JP)

(72) Inventor: Hideki Soejima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 244 days.

(21) Appl. No.: 16/149,281

(22) Filed: Oct. 2, 2018

(65) Prior Publication Data
US 2019/0033267 A1    Jan. 31, 2019

Related U.S. Application Data

(63) Continuation of application No. PCT/JP2017/013866, filed on Apr. 1, 2017.

(30) Foreign Application Priority Data

Apr. 6, 2016   (JP) ............................... JP2016-76918

(51) Int. Cl.
*G01N 29/04* (2006.01)
*G01N 29/22* (2006.01)
(Continued)

(52) U.S. Cl.
CPC ............. *G01N 29/041* (2013.01); *B64F 5/60* (2017.01); *G01N 29/04* (2013.01); *G01N 29/11* (2013.01);
(Continued)

(58) Field of Classification Search
CPC .................................................... G01N 29/48
See application file for complete search history.

(56) References Cited

U.S. PATENT DOCUMENTS 4,549,437 A    10/1985 Weins et al.
4,746,858 A *  5/1988 Metala ............... G01N 27/9046
                                                    324/200

(Continued)

FOREIGN PATENT DOCUMENTS

JP    S60-203854 A    10/1985
JP    05-045338       2/1993
(Continued)

OTHER PUBLICATIONS

Extended European Search Report dated Oct. 7, 2019 for European Patent Application No. 17779070.6 (7 pages).
(Continued)

*Primary Examiner* — Alexander A Mercado
(74) *Attorney, Agent, or Firm* — Smith, Gambrell & Russell, LLP

(57) ABSTRACT

According to one implementation, an ultrasonic inspection system includes: a first inspection unit, a second inspection unit, and a signal processing system. The first inspection unit acquires a detection signal of a first ultrasonic wave in a first inspection section of an structural object, using a first ultrasonic transducer and a first ultrasonic sensor. The second inspection unit acquires a detection signal of a second ultrasonic wave in a second inspection section of the structural object, using a second ultrasonic transducer and a second ultrasonic sensor. The signal processing system obtains an index value representing inspection information of at least one of the first inspection section and the second inspection section, based on the detection signal of the first ultrasonic wave and the detection signal of the second ultrasonic wave.

17 Claims, 9 Drawing Sheets

(51) Int. Cl.
  *B64F 5/60* (2017.01)
  *G01N 29/11* (2006.01)
(52) U.S. Cl.
  CPC ... *G01N 29/223* (2013.01); *G01N 2291/0258* (2013.01); *G01N 2291/0289* (2013.01); *G01N 2291/105* (2013.01); *G01N 2291/106* (2013.01); *G01N 2291/2636* (2013.01); *G01N 2291/2694* (2013.01)

(56) References Cited

U.S. PATENT DOCUMENTS

| | | | |
|---|---|---|---|
| 6,006,163 | A | 12/1999 | Lichtenwalner et al. |
| 8,286,492 | B2 * | 10/2012 | Sohn ............... G01N 29/041 73/628 |
| 8,707,787 | B1 * | 4/2014 | Sohn ............... G01N 29/4418 73/602 |
| 2003/0043058 | A1 * | 3/2003 | Jamieson ............ G01S 17/933 340/961 |
| 2005/0061076 | A1 * | 3/2005 | Kim ............... G01M 5/0091 73/587 |
| 2006/0095223 | A1 | 5/2006 | Gordon et al. |
| 2006/0106550 | A1 | 5/2006 | Morin et al. |
| 2007/0130970 | A1 * | 6/2007 | Schwan ............ B64D 13/00 62/180 |
| 2007/0282541 | A1 * | 12/2007 | Griess ............... H04Q 9/00 702/34 |
| 2008/0156100 | A1 | 7/2008 | Hines |
| 2010/0036617 | A1 * | 2/2010 | Mathews ........... G01M 5/0041 702/34 |
| 2012/0255359 | A1 * | 10/2012 | Sohn ............... G01N 29/2475 73/598 |
| 2015/0293061 | A1 | 10/2015 | Stauffer et al. |
| 2017/0248551 | A1 * | 8/2017 | Pelivanov ............ G01N 29/07 |

FOREIGN PATENT DOCUMENTS

| | | |
|---|---|---|
| JP | 09-080035 | 3/1997 |
| JP | 09-178714 | 7/1997 |
| JP | 2000-046809 | 2/2000 |
| JP | 2002-131265 A | 5/2002 |
| JP | 2006-058291 A | 3/2006 |
| JP | 2009-047639 A | 3/2009 |
| JP | 2009-145154 | 7/2009 |
| JP | 2009-276095 | 11/2009 |
| JP | 2013-002823 A | 1/2013 |
| WO | 2017/175692 A1 | 4/2018 |

OTHER PUBLICATIONS

Written Opinion of the International Search Authority dated Jun. 20, 2017 for International Patent Application No. PCT/JP2017/013866 (5 pages in Japanese with English Translation).
International Preliminary Report on Patentability dated Oct. 9, 2018 for International Patent Application No. PCT/JP2017/013866 (6 pages in Japanese with English Translation).
International Search Report with Written Opinion for PCT/JP2017/13866 dated Jun. 20, 2017 in Japanese Language (10 pages inclusive of 2 page translation of the ISR).
First Japanese Office Action dated Mar. 13, 2018 in Patent Application 2017-5235444 (7 pages inclusive of English machine translation).
First European Office Action dated Feb. 3, 2021 for European Patent Application No. 17779070.6 (6 pages).

\* cited by examiner

|  | SECTION1 | SECTION2 | SECTION3 | SECTION4 | SECTION5 | SECTION6 |
|---|---|---|---|---|---|---|
| SECTION1 |  | AB | AC | AD | AE | AF |
| SECTION2 | BA |  | BC | BD | BE | BF |
| SECTION3 | CA | CB |  | CD | CE | CF |
| SECTION4 | DA | DB | DC |  | DE | DF |
| SECTION5 | EA | EB | EC |  |  | EF |
| SECTION6 | FA | FB | FC | FD | FE |  |

FIG. 5

|  | SECTION1 | SECTION2 | SECTION3 | SECTION4 | SECTION5 | SECTION6 |
|---|---|---|---|---|---|---|
| SECTION1 |  | AB | AC | AD | AE | AF |
| SECTION2 | BA |  | BC | BD | BE | BF |
| SECTION3 | CA | CB | CC | CD | CE | CF |
| SECTION4 | DA | DB | DC |  | DE | DF |
| SECTION5 | EA | EB | EC |  | EE | EF |
| SECTION6 | FA | FB | FC | FD | FE |  |

FIG. 6

ULTRASONIC INSPECTION SYSTEM, ULTRASONIC INSPECTION METHOD AND AIRCRAFT STRUCTURAL OBJECT

CROSS REFERENCES TO RELATED APPLICATIONS

This is a continuation of Application PCT/JP2017/13866, filed on Apr. 1, 2017.

This application is based upon and claims the benefit of priority from Japanese Patent Application No. 2016-76918 filed on Apr. 6, 2016; the entire contents of which are incorporated herein by reference.

FIELD

Implementations described herein relate generally to an ultrasonic inspection system, an ultrasonic inspection method and an aircraft structural object.

BACKGROUND

Conventionally, SHM (Structural Health Monitoring) technology is known as a method of easily inspecting deterioration and damage of a large structural object, such as an aircraft part a building, a windmill, a bridge, or a pipeline. The SHM technology is for diagnosing a position or degree of deterioration or damage in a structural object by detecting a change in physical quantity, such as strain, an ultrasonic wave or an acceleration, in the structural object by a sensor which is placed on the structural object and analyzing the detected change in the physical quantity.

In general SHM technology, a physical quantity measured when a structural object is healthy without deterioration and damage is compared with one measured at the time of subsequent periodic inspection or the like so that a position or degree of deterioration or damage in the structural object can be diagnosed based on a difference between the measured physical quantities. That is, health of a structural object in a flaw detection area by one certain sensor is diagnosed using information from the sensor.

Furthermore, SHM technology for health diagnosis of a structural object by disposing sensors at a plurality of positions of the structural object is also proposed (for example, refer to Japanese Patent Application Publication JP2002-131265A, Japanese Patent Application Publication JP2006-058291A, and Japanese Patent Application Publication JP2009-047639A). For example, a technology of disposing sensors in a same inspection area to compare detection signals of guided waves obtained by the respective sensors, and the like are proposed.

An object of the present invention is to make it possible to monitor health of a structural object, such as an aircraft structural object, with more satisfactory accuracy.

Further, another object of the present invention is to make it possible to monitor health of a structural object more efficiently.

SUMMARY OF THE INVENTION

In general, according to one implementation, an ultrasonic inspection system includes: a first inspection unit, a second inspection unit, and a signal processing system. The first inspection unit acquires a detection signal of a first ultrasonic wave in a first inspection section of an structural object, using a first ultrasonic transducer and a first ultrasonic sensor. The second inspection unit acquires a detection signal of a second ultrasonic wave in a second inspection section of the structural object, using a second ultrasonic transducer and a second ultrasonic sensor. The signal processing system obtains an index value representing inspection information of at least one of the first inspection section and the second inspection section, based on the detection signal of the first ultrasonic wave and the detection signal of the second ultrasonic wave.

Further, according to one implementation, an aircraft structural object includes the above-mentioned ultrasonic inspection system as a part.

Further, according to one implementation, an ultrasonic inspection method includes: acquiring a detection signal of a first ultrasonic wave in a first inspection section of an structural object, using a first ultrasonic transducer and a first ultrasonic sensor; acquiring a detection signal of a second ultrasonic wave in a second inspection section of the structural object, using a second ultrasonic transducer and a second ultrasonic sensor; and obtaining an index value representing inspection information of at least one of the first inspection section and the second inspection section, based on the detection signal of the first ultrasonic wave and the detection signal of the second ultrasonic wave.

BRIEF DESCRIPTION OF THE DRAWINGS

In the accompanying drawings:

FIG. 5 shows an example of inspection information obtained in the signal processing system shown in FIG. 1;

FIG. 6 shows an example of inspection information in a case where an inspection section with a defect or an inspection section in which a defect may exist has been automatically detected in the signal processing system shown in FIG. 1;

DETAILED DESCRIPTION

An ultrasonic inspection system, an ultrasonic inspection method, and an aircraft structural object according to implementations of the present invention will be described with reference to the accompanying drawings.

(First Implementation)
(Structure and Function)

Figure 1:
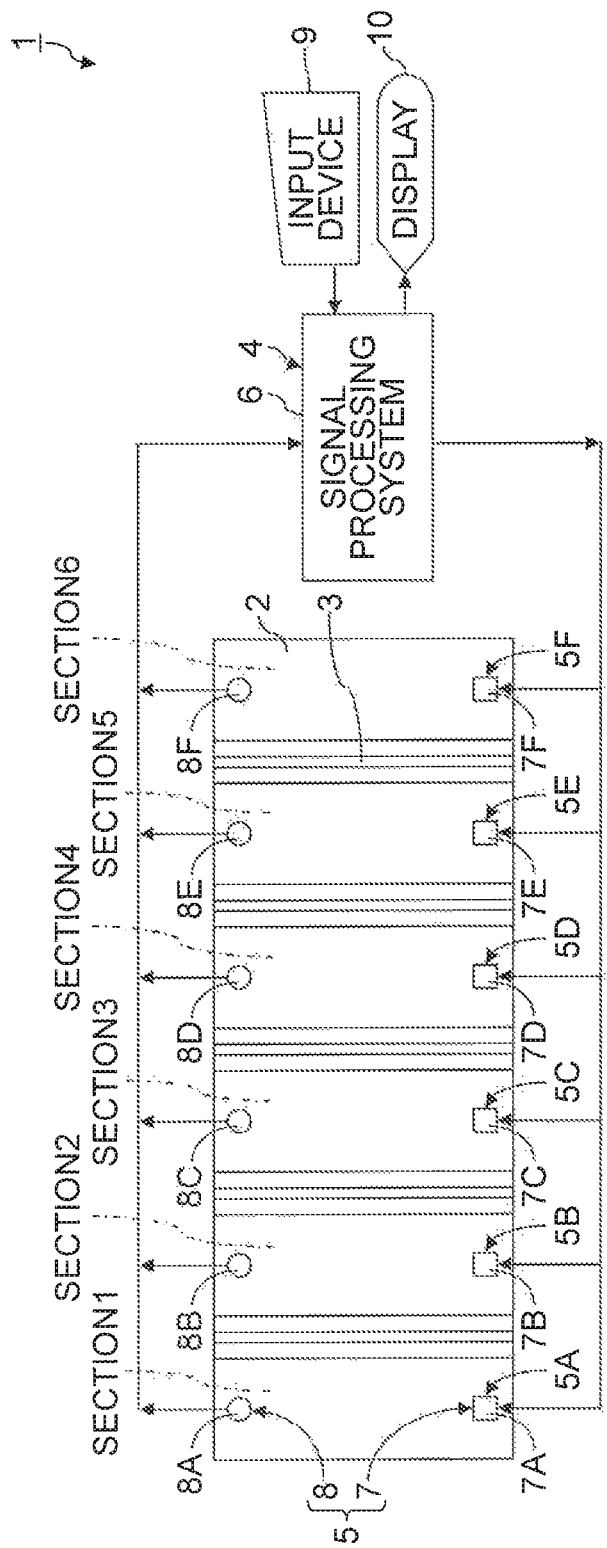
FIG. 1 is a front view showing a structure of an aircraft structural object including an ultrasonic inspection system according to the first implementation of the present invention.
Figure 2:
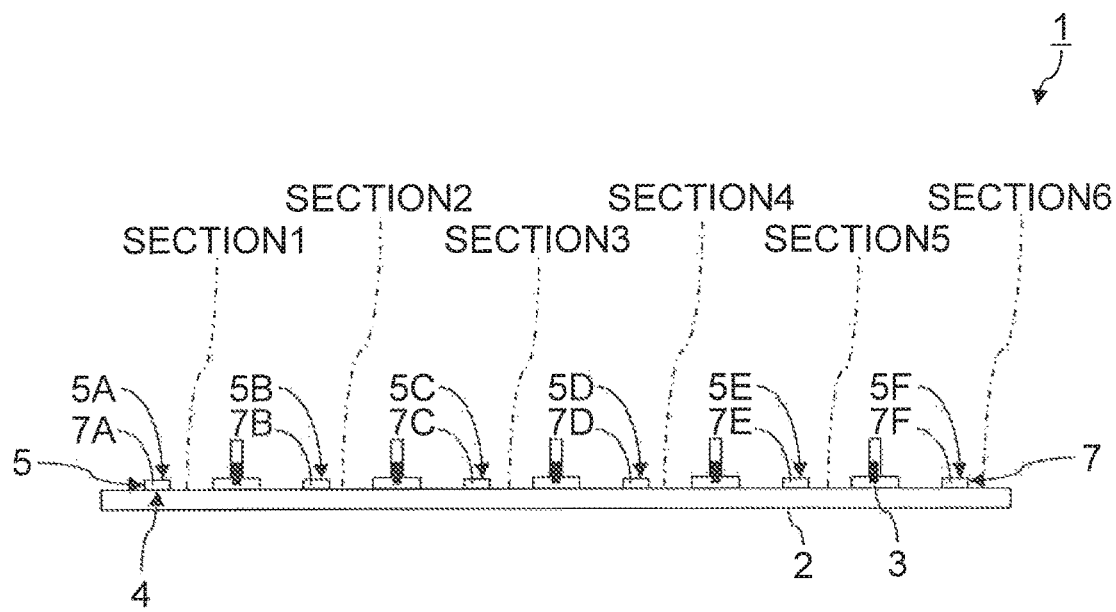
FIG. 2 is a bottom view of the aircraft structural object shown in FIG. 1.

FIG. 1 is a front view showing a structure of an aircraft structural object including an ultrasonic inspection system according to the first implementation of the present invention, and FIG. 2 is a bottom view of the aircraft structural object shown in FIG. 1.

An aircraft structural object 1 has a structure in which stringers 3 are attached on a panel 2, for example. In the illustrated example, the five stringers 3 have been mounted almost in parallel on the panel 2. Consequently, six spaces which are sectioned by the stringers 3 and the panel 2 are formed. Further, an ultrasonic inspection system 4 is included as a part in the aircraft structural object 1. The ultrasonic inspection system 4 is a system for detecting an inspection section in which a defect exists or an inspection section in which a defect may exist, out of inspection sections of the aircraft structural object 1, using ultrasonic waves.

The ultrasonic inspection system 4 has inspection units 5 and a signal processing system 6. In the illustrated example, six platy portions of the panel 2 divided by the five stringers 3 are inspection sections respectively. Therefore, the inspection units 5 are disposed in the inspection section respectively. Specifically, the first inspection section (SECTION1) to the sixth inspection section (SECTION6) align in the above-mentioned order, and the first inspection unit 5A to the sixth inspection unit 5F can inspect the first inspection section (SECTION1) to the sixth inspection section (SECTION6) respectively.

Each of the inspection units 5 is composed of an actuator 7 and an ultrasonic sensor 8. The actuator 7 is an ultrasonic transducer for oscillating an ultrasonic wave towards an inspection section. The ultrasonic sensor 8 is a sensor for detecting an ultrasonic wave which transmits the inspection section. Therefore, the ultrasonic sensor 8 is disposed at a position opposed to the actuator 7 across an inspection section.

An optical fiber sensor, such as a FBG (fiber Bragg grating) sensor or a PS-FBG (phase-shifted FBG) sensor, besides an ultrasonic transducer, can be used as the ultrasonic sensor 8. The PS-FBG is a FBG in which a local phase shift is introduced into a periodic change of the refractive index.

Note that, an ultrasonic sensor for detecting an ultrasonic reflected wave reflected in an inspection section may be disposed as an element of each of the inspection units 5, in addition to the ultrasonic sensor 8 for detecting an ultrasonic transmitted wave from the inspection section, or in place of the ultrasonic sensor 8 for detecting an ultrasonic transmitted wave from the inspection section, so that the ultrasonic reflected wave can be detected. In that case, an ultrasonic sensor for detecting an ultrasonic reflected wave reflected in an inspection section is disposed at a position where the ultrasonic reflected wave can be detected, e.g., a position adjacent to the actuator 7 toward the inspection section.

When the inspection units 5 are disposed in the inspection sections respectively, an ultrasonic inspection can be performed for every inspection section, with the actuator 7 and the ultrasonic sensor 8. That is, a detection signal of an ultrasonic wave in an inspection section of the aircraft structural object 1 can be acquired with the actuator 7 and the ultrasonic sensor 8 in each of the inspection units 5.

When the first inspection section (SECTION1) to the sixth inspection section (SECTION6) are targets for inspection, for example, the first to the sixth ultrasonic detection signals in the first inspection section (SECTION1) to the sixth inspection section (SECTION6) of the aircraft structural object 1 are acquirable respectively using the first to the sixth actuators 7A, 7B, 7C, 7D, 7E and 7F, and the first to the sixth ultrasonic sensors 8A, 8B, 8C, 8D, 8E, and 8F, as illustrated.

A detection signal of an ultrasonic wave obtained by each of the ultrasonic sensors 8 is output to the signal processing system 6. The signal processing system 6 oscillates an ultrasonic wave from each of the actuators 7 by outputting a control signal to each of the actuators 7 and obtains the detection signal of the ultrasonic wave from each of the ultrasonic sensors 8 to perform signal processing for acquiring inspection information.

The signal processing system 6 can be composed of circuits including a D/A (digital to analog) converter, an amplifier, an A/D (analog to digital) converter, and a computer. When the ultrasonic sensor 8 is an optical fiber sensor, a photoelectric conversion device for converting an optical signal into an electric signal in addition to an optical system, composed of an optical circulator for branching an output path of the optical signal from an optical path for propagating a laser light from a light source to the optical fiber sensor, a wavelength filter for signal processing of a detection signal of an ultrasonic wave output as the optical signal from the ultrasonic sensor 8, and the like are included as elements of the signal processing system 6. That is, the signal processing system 6 is composed of at least circuits, and necessary optical elements can be used as elements when the ultrasonic sensor 8 is an optical fiber sensor. Further, an input device 9 for inputting necessary information and a display 10 for displaying necessary information are connected to the signal processing system 6.

The signal processing system 6 is configured to obtain an index value showing inspection information of at least one of two inspection sections, based on two detection signals of ultrasonic waves obtained in at least the two inspection sections, out of detection signals of ultrasonic waves obtained in the inspection sections.

Figure 3:
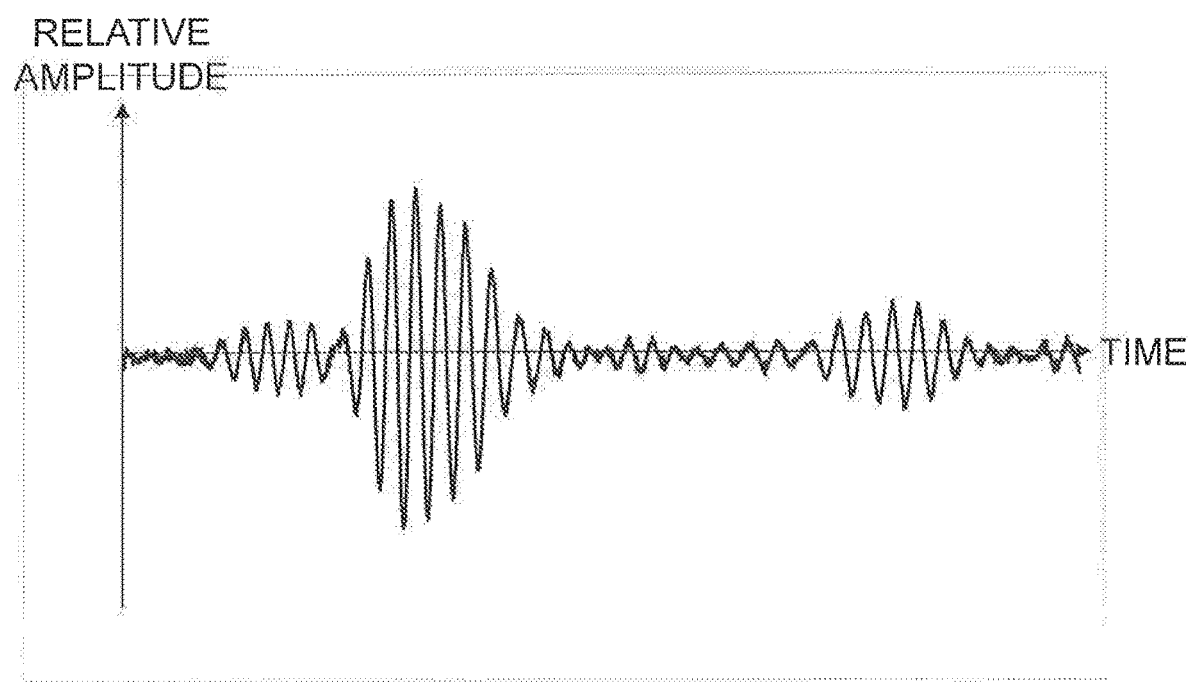
FIG. 3 is a graph which shows an example of detection signal waveform of an ultrasonic wave obtained in a certain inspection section in the aircraft structural object shown in FIG. 1.
Figure 4:
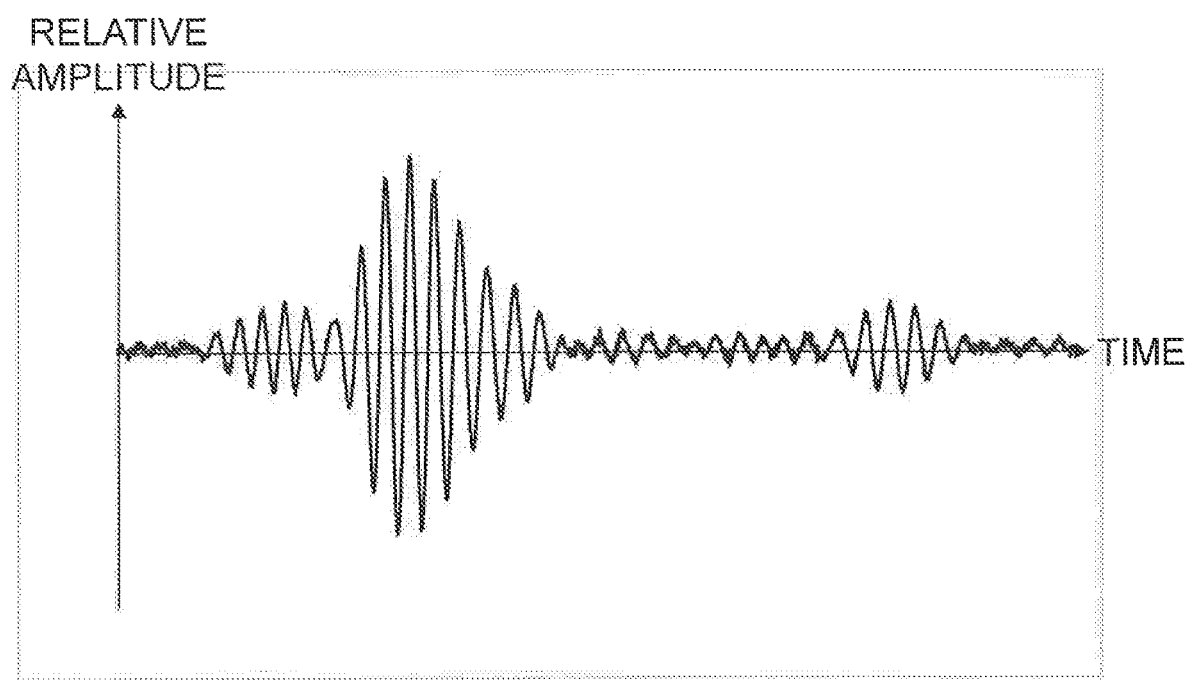
FIG. 4 is a graph which shows an example of detection signal waveform of an ultrasonic wave obtained in another inspection section of the aircraft structural object shown in FIG. 1.

FIG. 3 is a graph which shows an example of detection signal waveform of an ultrasonic wave obtained in a certain inspection section in the aircraft structural object 1 shown in FIG. 1, and FIG. 4 is a graph which shows an example of detection signal waveform of an ultrasonic wave obtained in another inspection section of the aircraft structural object 1 shown in FIG. 1.

In each of FIG. 3 and FIG. 4, the horizontal axis shows time while the vertical axis shows a relative intensity of an ultrasonic detection signal. When structures of two inspection sections from which two ultrasonic detection signals are acquired are considered to be the same as each other, the two ultrasonic detection signals similar to each other are obtained as exemplified in FIG. 3 and FIG. 4 as long as no defect exists.

For example, when the inspection units 5A, 5B, 5C, 5D, 5E, and 5F respectively use the actuators 7A, 7B, 7C, 7D, 7E and 7F, and the ultrasonic sensors 8A, 8B, 8C, 8D, 8E, and 8F, which are respectively disposed at a same interval, to respectively acquire detection signals in the inspection sections (SECTION1, SECTION2, SECTION3, SECTION4, SECTION5 and SECTION6) each divided from another inspection section by two walls formed by at least the stringers 3 disposed at a same interval as exemplified in FIG. 1 and FIG. 2, structures of the inspection sections (SEC- TION1, SECTION2, SECTION3, SECTION4, SECTION5 and SECTION6) can be considered to be the same as each other.

Specifically, distances between the actuators 7A, 7B, 7C, 7D, 7E, and 7F, and the ultrasonic sensors 8A, 8B, 8C, 8D, 8E, and 8F, widths of the panel 2 divided by the stringers 3, a board thickness of the panel 2 and material of the panel 2 are the same respectively, the structures of the inspection sections (SECTION1, SECTION2, SECTION3, SECTION4, SECTION5 and SECTION6) can be considered to be the same as each other.

In other words, in case of a structure in which the demarcating reinforcing members, such as the stringers 3, are attached at a same interval in parallel on the panel 2 whose thickness is constant, the inspection sections (or demarcated regions) which can be considered to be the same as each other can be formed by disposing the actuators 7 and the ultrasonic sensors 8 respectively at a same interval in areas on the panel 2 sectioned by the reinforcing members.

Note that, examples of a reinforcing member attached to the panel 2 in a structure for an aircraft include a spar, a rib and a frame besides the stringer 3. Therefore, plate form areas divided by not only the stringers 3 but other reinforcing members may also be inspection sections.

In particular, when plate form areas of the panel 2 or the like are inspection sections, it is preferable to use a Lamb wave as an ultrasonic wave. A Lamb wave is an ultrasonic wave propagating in a thin plate whose thickness is not more than half of a wavelength of the ultrasonic wave, and is comparatively hardly attenuated. For that reason, using a Lamb wave makes it possible to improve an SNR (signal to noise ratio) and accuracy of a detection signal of an ultrasonic wave. Therefore, when Lamb waves are respectively transmitted to inspection sections of which structures can be considered to be the same as each other so that a detection signal of the Lamb wave can be obtained from each inspection section, waveforms of the detection signals become mostly similar to each other as exemplified in FIG. 3 and FIG. 4 as long as each inspection section has no defect.

That is, making the respective inspection units 5 to use the actuators 7 and the ultrasonic sensors 8, which are disposed at a same interval respectively, to acquire detection signals of Lamb waves from platy inspection sections of which propagating conditions of the Lamb waves are the same as each other allows acquiring detection signals of ultrasonic waves having waveforms similar to each other as long as each inspection section has no defect.

Therefore, the health of each inspection section can be evaluated with detection signals of ultrasonic waves which have waveforms similar to each other. Specifically, based on two detection signals of ultrasonic waves obtained in at least two inspection sections out of the detection signals of the ultrasonic waves obtained in the inspection sections, at least one index value which shows the health of at least one of the two inspection sections can be obtained, as mentioned above.

The index value showing inspection information in a certain inspection section may be a scalar value calculated by desired operation of which input data are at least two detection signals including a detection signal obtained in the inspection section and at least one detection signal obtained in another inspection section or other inspection sections. Specifically, an index value showing inspection information may be calculated by operation whose input data are three or more detection signals obtained from three or more inspection sections, not limited to operation whose input data are two detection signals obtained from two inspection sections.

Henceforth, a case where an index value is obtained by simple operation whose input data are two detection signals will be explained as an example.

Concrete examples of index value include a cross correlation coefficient and a root mean square error (or "square error") of time-series detection signals, besides a representative value, such as an average value, an intermediate value, the maximum value or an integral value in the time direction, of an addition signal, a subtraction signal, a multiplication signal or a division signal of the time-series detection signals. When operation has commutative law and combinations of detection signals for obtaining index vales are the same as each other, the index values become same. When a cross correlation coefficient or a square error is an index value, two detection signals are input data for calculating the index value.

When there are two inspection sections, for example, an index value showing inspection information on at least one of the first inspection section (SECTION1) and the second inspection section (SECTION2) is obtained based on a detection signal of the first ultrasonic wave obtained from the first inspection section (SECTION1) and a detection signal of the second ultrasonic wave obtained from the second inspection section (SECTION2).

When operation for obtaining the index value has the commutative law, the common index value showing inspection information on both the first inspection section (SECTION1) and the second inspection section (SECTION2) is obtained based on the detection signal of the first ultrasonic wave obtained from the first inspection section (SECTION1) and the detection signal of the second ultrasonic wave obtained from the second inspection section (SECTION2).

On the contrary, when the operation for obtaining the index value does not have the commutative law, like an operation for calculating a subtraction value or an average value of a division signal, the first index value showing inspection information of the first inspection section (SECTION1) and the second index value showing inspection information of the second inspection section (SECTION2) are obtained separately, based on a detection signal of the first ultrasonic wave obtained from the first inspection section (SECTION1) and a detection signal of the second ultrasonic wave obtained from the second inspection section (SECTION2), by operating twice with changing the operation direction.

When operation for obtaining an index value has the commutative law, obtaining plural index values requires to obtain detection signals of ultrasonic waves from three or more inspection sections. When detection signals of ultrasonic waves are obtained from three inspection sections, for example, an index value based on the detection signal of the first ultrasonic wave obtained from the first inspection section (SECTION1) and the detection signal of the second ultrasonic wave obtained from the second inspection section (SECTION2), an index value based on the detection signal of the first ultrasonic wave and the detection signal of the third ultrasonic wave obtained from the third inspection section (SECTION3), and an index value based on the detection signal of the second ultrasonic wave and the detection signal of the third ultrasonic wave are to be calculated in the signal processing system 6.

When a plural of index values are calculated, the index values can be compared with each other. Therefore, obtaining index values suitable for the comparison lead to improvement in ease and accuracy of health evaluation. In particular, when two waveforms of detection signals of ultrasonic waves which are original data for calculating an index value are similar to each other, examples of an index value suitable for the comparison include a cross correlation coefficient, a square error, a representative value of differential signal and a representative value of division signal. Thus, it is effective to calculate a cross correlation coefficient, a square error, a representative value of differential signal or a representative value of division signal between two detection signals, as an index value showing inspection information, in the signal processing system 6.

Note that, instead of directly targeting two detection signals of ultrasonic waves output from the two ultrasonic sensors 8 for calculating a cross correlation coefficient or the like, detection signals after necessary signal processing may be targeted for calculating a cross correlation coefficient or the like. For concrete example, two detection signals after performing various signal processing, such as noise removal processing, averaging processing, envelope detection processing, and/or the like may also be targets for calculating a cross correlation coefficient or the like.

Therefore, the signal processing system 6 may calculate a cross correlation coefficient, a square error, a representative value of differential signal or a representative value of division signal between detection signals obtained by the inspection units 5 or between signals corresponding to the detection signals. In other words, a cross correlation coefficient, a square error, a representative value of differential signal or a representative value of division signal may be calculated based on detected signals of ultrasonic waves consisting of signals after various signal processing, such as noise rejection processing, averaging processing, and/or envelope detection processing.

FIG. 5 shows an example of inspection information obtained in the signal processing system 6 shown in FIG. 1.

FIG. 5 shows a table of health evaluation indicating and arranging index values each calculated by operation whose input data are two detection signals out of ultrasonic detection signals A, B, C, D, E, and F obtained from six inspection sections (SECTION1, SECTION2, SECTION3, SECTION4, SECTION5 and SECTION 6) respectively as shown in FIG. 1.

Each two letters of alphabet shown in FIG. 5 represents an index value obtained by operation targeting two detection signals out of the six detection signals A, B, and C, D, E, and F in the indicated order. When the operation has the commutative law, the index values are symmetrical about the oblique line. For example, a value of "AB" is same as that of "BA".

When each index value is a cross correlation coefficient or a representative value of division signal, each index value becomes close to 1 so long as no defect arises in each inspection section since two detection signals used for calculating the cross correlation coefficient or the representative value of division signal have waveforms similar to each other. When each index value is a square error or a representative value of differential signal, each index value becomes close to 0 for the same reason so long as no defect arises in each inspection section. That is, the index values indicated on the healthy evaluation table become uniform so long as any of the six inspection sections (SECTION1, SECTION2, SECTION3, SECTION4, SECTION5 and SECTION 6) is healthy.

Meanwhile, when a defect arises in a certain inspection section, a waveform of detection signal of ultrasonic wave obtained from the inspection section changes. Therefore, each index value whose input data include the detection signal of the ultrasonic wave obtained from the inspection section in which the defect has arisen also changes. When each index value is a cross correlation coefficient or a representative value of division signal, for example, the deviation quantity from 1 increases. Meanwhile, when each index value is a square error or a representative value of differential signal, the deviation quantity from 0 increases.

Therefore, when the health evaluation table which represents a distribution of the index values as exemplified in FIG. 5 is displayed on the display 10 as inspection information, a user can estimate health of the respective inspection sections (SECTION1, SECTION2, SECTION3, SECTION4, SECTION5 and SECTION 6) by referring to each of the index values indicated on the health evaluation table.

In particular, if a simple index value, such as the maximum value or the peak time of a detection signal of an ultrasonic wave obtained in each inspection section, which is calculated without a detection signal obtained in another inspection section is displayed, the index value may not change notably even when a waveform of a certain detection signal changes because of a defect. For example, when only a waveform itself or a peak time of a detection signal shifts in the direction of time, the maximum value of the detection signal displayed as the index value does not change notably. Meanwhile, even if a peak time of a detection signal is displayed as an index value, the index value does not change notably when the second and following peak times change or the maximum value changes.

On the contrary, when an index value is calculated based on two detection signals of ultrasonic waves utilizing the nature that the two waveforms of the detection signals of the ultrasonic waves have correlation, as mentioned above, a defect is easily detectable as a remarkable change in the index value as long as one waveform of detection signal of ultrasonic wave changes because of the defect.

Further, health can be evaluated by substantially comparing two waveforms of detection signals of ultrasonic waves with each other. Therefore, a reference signal at healthy state need not be obtained in advance for every inspection section necessarily. In other words, the signal processing system 6 can obtain index values, which show inspection information of two inspection sections, without referring to any of detection signals of ultrasonic waves at past healthy state in the two inspection sections.

Therefore, in the initial health inspection of the aircraft structural object 1 having a large number of inspection sections of which structures are considered to be the same as each other, health can be evaluated without obtaining reference signals at healthy state beforehand. Moreover, health evaluation of each inspection section in the second and following health inspections can also be performed without referring to the past inspection data.

Note that, it is also possible to conduct a new health inspection with reference to the past inspection data at healthy state. In other words, the health inspection in the inspection sections may also be conducted based on temporal changes of the index values. In that case, the signal processing system 6 can automatically detect an inspection section in which a defect exists or an inspection section in which a defect may exist, out of the inspection sections, based on the temporal changes of the index values.

FIG. 6 shows an example of inspection information in a case where an inspection section with a defect or an inspection section in which a defect may exist has been automatically detected in the signal processing system 6 shown in FIG. 1.

When a defect, such as a deterioration or a damage, arises in the third inspection section (SECTION3) of the aircraft structural object 1 shown in FIG. 1, for example, the detection signal C of the ultrasonic wave obtained in the third inspection section (SECTION3) changes to a detection signal C' whose waveform is different. Therefore, all the index values AC', BC', DC', EC', FC', C'A, C'B, C'D, C'E, and C'F calculated using the detection signal C' of the ultrasonic wave obtained in the third inspection section (SECTION3) change.

Thus, the changed index values AC', BC', DC', EC', FC', C'A, C'B, C'D, C'E, and C'F can be automatically detected in the signal processing system 6 and the detected index values AC', BC', DC', EC', FC', C'A, C'B, C'D, C'E, and C'F can be identified on the display 10. When a two dimensional health evaluation table as exemplified in FIG. 6 is indicated on the display 10, all the index values AC', BC', DC', EC', FC', C'A, C'B, C'D, C'E, and C'F corresponding to the third inspection section (SECTION3) in which the defect arose are highlighted as crossed singular lines.

Therefore, a user can easily grasp that a defect exists in the third inspection section (SECTION3) or a defect may exist in the third inspection section (SECTION3), with reference to the health evaluation table. In other words, an inspection section in which a defect exists or an inspection section in which a defect may exist can be easily grasped out of the inspection sections. Then, a detailed inspection can be performed regarding the inspection section in which a defect may exist.

Examples of a method of automatically detecting an index value which changed due to a defect includes a method of detecting a change of the index value based on comparison with another index value or the index value itself without referring to a past index value, besides a method of detecting a temporal change of the index value as mentioned above.

When a temporal change of each index value is detected, each index value at a past healthy state can be stored as exemplified in FIG. 5 so that a change of each index value can be automatically determined when a difference value between the past index value and the present index value becomes not less than a threshold or more than a threshold.

Meanwhile, when a change of each index value is detected without referring to the past index value, a change of each index value can be automatically detected by detecting a singular value from the plurality of the index values. For example, a change of a certain index value can be automatically determined when a difference value between an average value or an intermediate value of the index values and the certain index value becomes not less than a threshold value or more than a threshold value. Alternatively, a threshold value may be set to each index value itself so that it can also be automatically determined that a certain index value changed when the certain index value becomes not less than the threshold value or more than the threshold value. That is, a threshold value can be set to an index value itself for threshold processing since the index value itself represents a difference between two detection signals of ultrasonic waves.

When a change of each index value is automatically detected by threshold processing of each index value itself or a difference value between each present index value and the corresponding past index value, i.e., when index values are not compared with each other between a pair of different inspection sections, a change of the index value can be detected even when the number of the index values is one. In other words, even when the number of the inspection sections is two, it can be detected automatically that a defect exists or a defect may exist in at least one of the two inspection sections by detecting a change of a single index value.

When index values are not compared between a pair of different inspection sections, inspection targeting inspection sections of which structures are not considered to be the same as each other is also possible. Specifically, index values, which are not necessarily even, corresponding to three or more inspection sections of which structures are not necessarily considered to be the same as each other can be obtained so that an inspection section in which a defect exists or an inspection section in which a defect may exist can be automatically detected by comparison between each present index value and the corresponding past index value or threshold processing of each index value itself. Further, a single index value corresponding to two inspection sections of which structures are not considered to be the same as each other may be obtained so that it can be automatically detected that a defect exists or a defect may exist in at least one of the two inspection sections by comparison between the past index value and the present index value or threshold processing of the index value itself.

As described above, the signal processing system 6 can automatically detect an inspection section in which a defect exists or an inspection section in which a defect may exist, based on at least one index value calculated with detection signals of ultrasonic waves obtained in inspection sections even when structures of the inspection sections which are separated from another inspection section by at least one wall surface cannot be consider to be the same as each other.

Note that, a threshold value for detecting a change of an index value can be determined experientially. When an index value is a cross correlation coefficient or a representative value of differential signal and structures of inspection sections can be considered to be the same as each other, for example, a permitted deviation quantity from one is a threshold value to the index value itself. When an index value is a square error or a representative value of subtraction signal and structures of inspection sections can be considered to be the same as each other, a permitted deviation quantity from zero is a threshold value to the index value itself.

A threshold value may be determined by an examination using a typical model regardless of whether structures of inspection sections can be considered to be the same as each other. When an aircraft is mass produced, an appropriate threshold value or appropriate threshold values can be determined by an examination for inspection sections of a typical aircraft structural object 1 or a structural object which simulates the aircraft structural object 1, for example. Thereby, the need for obtaining waveforms of inspection signals of ultrasonic waves at healthy state in many inspection sections for each aircraft can be eliminated.

(Operation and Action)

Next, an ultrasonic inspection method of the aircraft structural object 1 by the ultrasonic inspection system 4 will be described.

Figure 7:
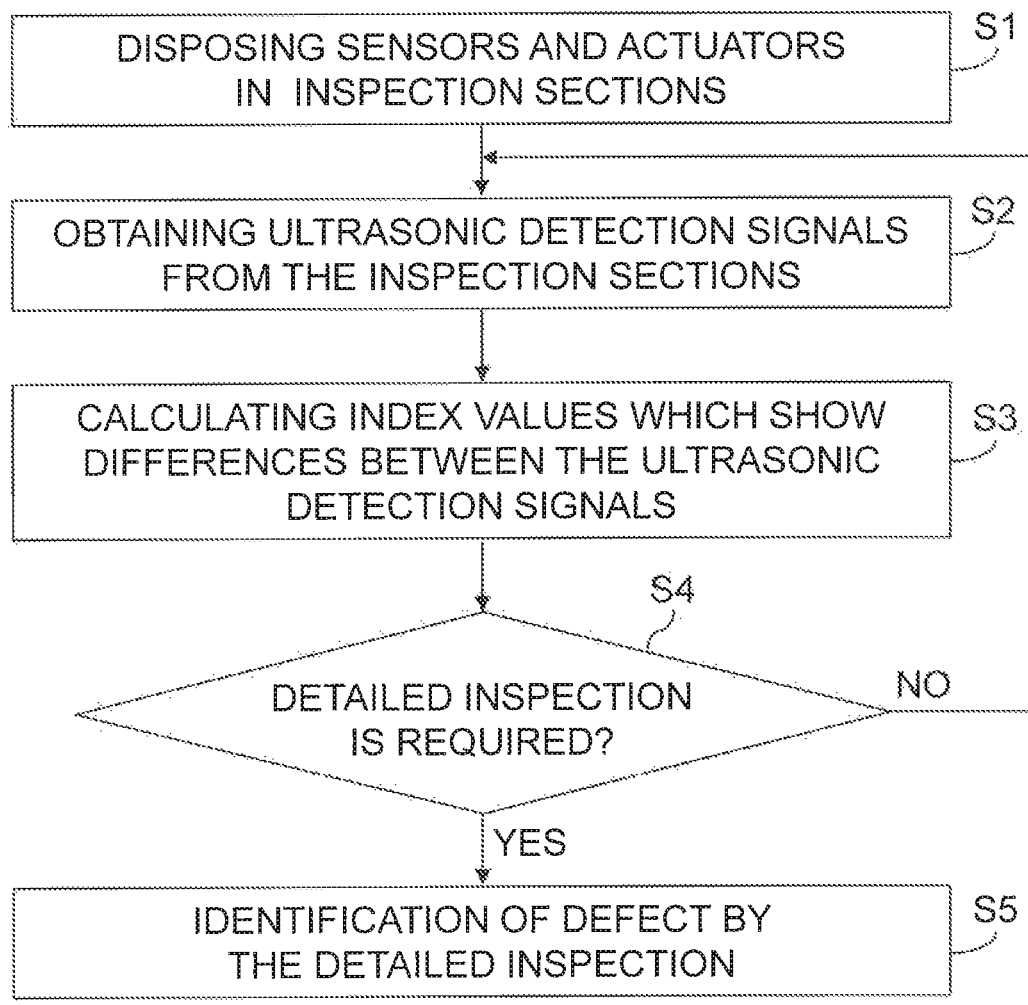
FIG. 7 is a flow chart which shows an example of flow for ultrasonic inspection of the aircraft structural object 1 by the ultrasonic inspection system 4 shown in FIG. 1.

FIG. 7 is a flow chart which shows an example of flow for ultrasonic inspection of the aircraft structural object 1 by the ultrasonic inspection system 4 shown in FIG. 1.

In step S1, the inspection units 5 are previously disposed in inspection sections of the aircraft structural object 1 respectively, as exemplified in FIG. 1 and FIG. 2. Specifically, the actuator 7 and the ultrasonic sensor 8 are constructed at a same interval in each inspection section. Further, each of the actuators 7 and the ultrasonic sensors 8 is connected to the signal processing system 6. Thus, a health inspection by ultrasonic waves can be carried out for the inspection sections of the aircraft structural object 1.

When an ultrasonic inspection of the aircraft structural object 1 is conducted, a detection signal of an ultrasonic wave is obtained from each of the inspection sections, in step S2. That is, detection signals of ultrasonic waves in the respective inspection sections of the aircraft structural object 1 are obtained using the actuators 7 and the ultrasonic sensors 8 respectively. More specifically, an ultrasonic wave, preferably a Lamb wave is transmitted from each of the actuators 7 under the control by the signal processing system 6. Then, the ultrasonic waves which respectively transmitted the inspection sections are detected by the ultrasonic sensors 8 respectively. The detection signals of the ultrasonic waves in the inspection sections obtained by the ultrasonic sensors 8 respectively are output to the signal processing system 6.

Next, in step S3, necessary signal processing, such as averaging and envelope detection processing, is performed, and subsequently an index value, such as a cross correlation coefficient, is obtained as a scalar quantity, based on detection signals of ultrasonic waves obtained in each set of two inspection sections, in the signal processing system 6. This index value is a quantified scalar quantity substantially showing a deviation quantity between signals obtained as a comparison result of the detection signals of the ultrasonic waves obtained in the two inspection sections.

When detection signals of ultrasonic waves have been obtained from three or more inspection sections respectively as exemplified in FIG. 1 and FIG. 2, the index value is calculated for every combination of two detection signals selected from the detection signals of the ultrasonic waves. When structures of the inspection sections can be considered to be the same as each other, the waveforms of the detection signals become similar to each other, thereby the index values also become similar to each other as long as no defect exists.

Next, the signal processing system 6 displays the calculated index values on the display 10. As a result, a map of the index values as exemplified in FIG. 5 is indicated on the display 10. Therefore, a user can refer to the map of the index values, displayed on the display 10, serving as inspection information corresponding to the inspection sections.

If a defect exists or a defect may exist in one of the inspection sections, the waveform of the detection signal of the ultrasonic wave obtained from the corresponding inspection section changes. Therefore, each index value calculated using the detection signal of the ultrasonic wave obtained from the inspection section in which the defect exists or the defect may exist also changes. Accordingly, a user can specify the inspection section in which the defect exists or the defect may exist with reference to the map of the index values.

Alternatively, the signal processing system 6 can automatically detect a change of each index value by threshold processing using a threshold value set to each index value itself, singular value detection processing between different pairs of the inspection sections, or processing of detecting a change from the past index value (singular value detection processing in the time direction). Further, these processing may be used together.

When a change of one index value is found by a user or automatically detected in the signal processing system 6, an inspection section in which a defect exists or a defect may exist can be specified. When an inspection section in which a defect exists or a defect may exist has not been found or detected, it is determined that a detailed inspection of the inspection sections is unnecessary, in the judgment of step S4. Then, an inspection may be started again in the next periodic inspection or the like.

When an inspection section in which a defect exists or a defect may exist has been found or detected, it is determined that the inspection section in which the defect exists or the defect may exist needs to be inspected in detail, in the judgment of step S4. Then, in step S5, a detailed nondestructive inspection is conducted for the inspection section in which the defect exists or the defect may exist. For example, an ultrasonic inspection by comparison with a detection signal of ultrasonic wave at the healthy state may be conducted. Alternatively, an inspection using another inspection system may also be conducted. Thereby, a defect, such as a damage, can be identified.

As described above, the aircraft structural object 1, the ultrasonic inspection system 4, and the ultrasonic inspection method evaluate health using similarity in waveform among detection signals of ultrasonic waves obtained from inspection sections when structures of the inspection sections are considered to be the same as each other. Specifically, an index value or index values representing a relative difference or relative differences among detection signals of ultrasonic waves obtained from at least two inspection sections which have the same structure are indicated as inspection information for health diagnosis.

(Effects)

Therefore, according to the aircraft structural object 1, the ultrasonic inspection system 4, and the ultrasonic inspection method, diagnostic accuracy of health can be improved compared with the case where ultrasonic detection signals are not compared between inspection sections. That is, a waveform change of a ultrasonic detection signal can be grasped more certainly by comparing ultrasonic detection signals among inspection sections.

Moreover, the health can be evaluated on some level without referring to a waveform of the past ultrasonic detection signal at healthy state. Therefore, evaluation of health becomes possible even when a huge number of signal waveforms at healthy state are not stored as inspection records for every inspection section.

Further, at least a detailed inspection for every inspection section by comparison of signal waveforms can be made unnecessary. That is, an inspection section in which a defect exists or a defect may exist can be specified very easily based on an index value which is a scalar value representing comparison information of ultrasonic detection signals between inspection sections, and a detailed inspection based on comparison with a signal waveform at healthy state can be conducted with limiting to the specified inspection section. Thereby, a time required for health inspection of the aircraft structural object 1 can be shortened. That is, reduction of necessary reference signals and shortening of an inspection time can be attained by screening inspection sections based on at least one index value calculated based on parameters consisting of ultrasonic detection signals obtained in the inspection sections.

(Second Implementation)

Figure 8:
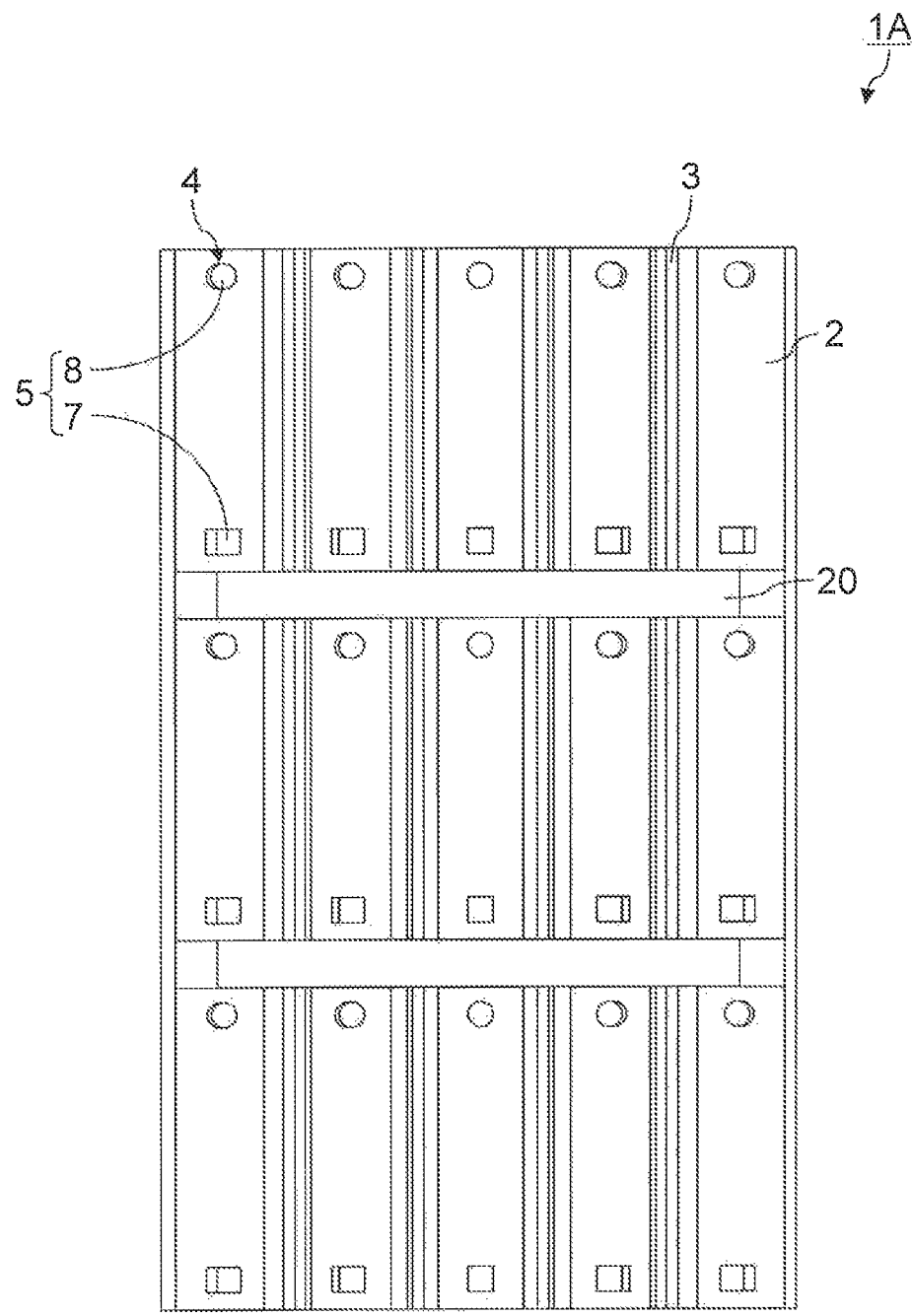
FIG. 8 is a front view showing a structure of an aircraft structural object according to the second implementation of the present invention.
Figure 9:
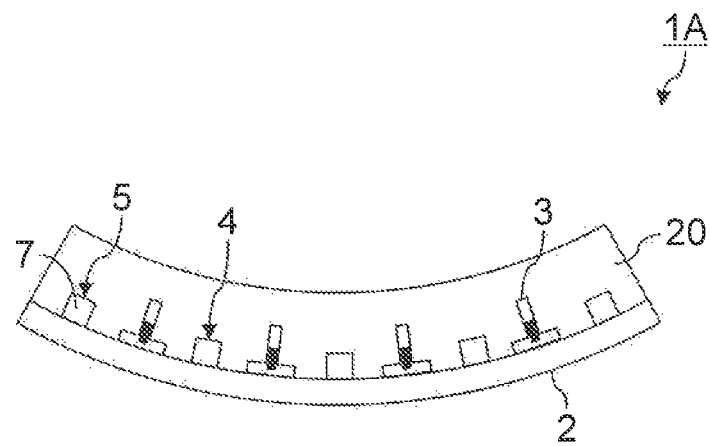
FIG. 9 is a bottom view of the aircraft structural object shown in FIG. 8.

FIG. 8 is a front view showing a structure of an aircraft structural object according to the second implementation of the present invention, and FIG. 9 is a bottom view of the aircraft structural object shown in FIG. 8.

In the second implementation, the structure of the aircraft structural object 1A to be inspected by the ultrasonic inspection system 4 differs from that in the first implementation. Since other features in the second implementation are similar to those in the first implementation, only the structure of the aircraft structural object 1A and the inspection units 5 are illustrated, and explanations about similar features are omitted.

The aircraft structural object 1A in the second implementation has a structure in which a plurality of the stringers 3 and a plurality of the frames 20 are attached to the curved panel 2. The stringers 3 and the frames 20 are attached to the panel 2 in directions where longitudinal directions are nearly orthogonal to each other. Specifically, the stringers 3 and the frames 20 are attached to the curved panel 2 so that longitudinal directions of the stringers 3 become nearly parallel while longitudinal directions of the frames 20 become nearly parallel. Meanwhile, the stringers 3 and the frames 20 are attached to the curved panel 2 so that the length direction of the stringers 3 becomes nearly perpendicular to the length direction of the frames 20.

As a result, many areas each surrounded by the two adjacent stringers 3 and the two adjacent frames 20 are formed on the panel 2. When both of intervals of the stringers 3 and intervals of the frames 20 can be considered to be equal to each other, structures of the areas can be considered to be the same as each other. Note that, the aircraft structural object 1A which has such a structure is mainly adopted as a structural object composing a part of fuselage.

Accordingly, the areas surrounded by the stringers 3 and the frames 20 can be objects to be inspected by the ultrasonic inspection system 4. In this case, inspection sections have been arranged two-dimensionally. Therefore, detection signals in the two-dimensionally arranged inspection sections can be acquired by the four or more inspection units 5 respectively.

Meanwhile, the signal processing system can calculate index values, corresponding to the two-dimensionally arranged inspection sections, by a method similar to that in a case where inspection sections are arranged one-dimensionally. Specifically, an index value based on two detection signals obtained by two inspection units 5 out of the four or more inspection units 5 can be calculated at least several times of which the number is same as the number of combinations in case of selecting two inspection units 5 out of the four or more inspection units 5. That is, the index values corresponding to the two-dimensionally arranged inspection sections can be calculated by repeating operation, by which two detection signals are selected out of the detection signals obtained from the more than three inspection sections arranged two-dimensionally and an index value is calculated based on the selected two detection signals, with changing the combination of selected two detection signals.

Thus, an arrangement of inspection sections is flexible as long as structures of the inspection sections can be considered to be the same as each other. Therefore, a similar health inspection based on at least one index value can be performed for not only inspection sections, divided by a common reinforcing member, whose structures are considered to be the same, but also inspection sections, divided by the different reinforcing members, whose structures are considered to be the same.

(Third Implementation)

Figure 10:
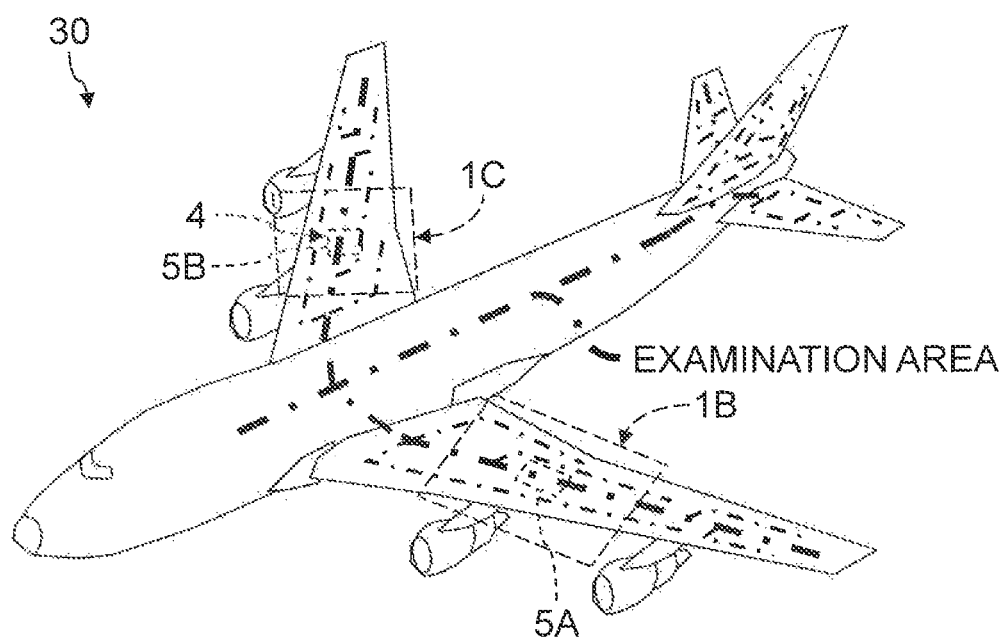
FIG. 10 is a perspective view of an aircraft including an aircraft structural object according to the third implementation of the present invention.

FIG. 10 is a perspective view of an aircraft including an aircraft structural object according to the third implementation of the present invention.

In the third implementation, a part of an aircraft 30 to be inspected by the ultrasonic inspection system 4 differs from that in the first implementation. Since other features in the third implementation are similar to those in the first implementation, only the aircraft 30 and attaching positions of the inspection unit 5A and the inspection unit 5B are illustrated, and explanations about similar features are omitted.

A plurality of inspection sections whose structures are considered to be the same as each other can be inspected by the ultrasonic inspection system 4 as explained in the second implementation. The aircraft 30 is symmetric with regard to the direction of movement and the center of fuselage. When the aircraft 30 is a fixed wing aircraft as shown in FIG. 10, for example, the right and left main wings, the right and left horizontal tail planes and the fuselage are symmetric with regard to the center of fuselage. This is the same not only in a fixed wing aircraft but also in a rotorcraft, a rocket and the like.

When the aircraft 30 is a fixed wing aircraft as shown in FIG. 10, health evaluation is required in portions shown by dashed-dotted lines, for example. This inspection areas include portions symmetric with regard to the center of fuselage. Specifically, the aircraft structural objects 1B and 1C symmetric with regard to the center of fuselage may be targets of health inspection.

Accordingly, when structures of inspection sections are plane symmetric, the structures of the inspection sections can be considered to be the same as each other, and the inspection sections can be inspected by the ultrasonic inspection system 4. Specifically, the first inspection unit 5A can be prepared in an inspection section of the first aircraft structural object 1B composing the aircraft 30. Meanwhile, the second inspection unit 5B can be prepared in an inspection section of the second aircraft structural object 1C disposed at a position symmetric with a position of the first aircraft structural object 1B about the center of fuselage of the aircraft 30 and having a structure symmetric with a structure of the first aircraft structural object 1B about the center of fuselage of the aircraft 30.

Then, a detection signal of the first ultrasonic wave in the inspection section of the first aircraft structural object 1B can be obtained by the first inspection unit 5A while a detection signal of the second ultrasonic wave in the inspection section of the second aircraft structural object 1C can be obtained by the second inspection unit 5B. Thereby, the signal processing system can calculate index values for the inspection section of the first aircraft structural object 1B and the inspection section of the second aircraft structural object 1C, by a method similar to that in the first implementation.

When the first aircraft structural object 1B has inspection sections and the second aircraft structural object 1C also has inspection sections, for example, the same kinds of index values can be obtained for all the inspection sections including symmetric inspection sections. Therefore, efficiency of health inspection can be improved. When each of the first aircraft structural object 1B and the second aircraft structural object 1C has only one inspection section, an index value, such as a cross correlation coefficient, can be calculated so that health of the first aircraft structural object 1B and the second aircraft structural object 1C can be evaluated based on whether the index value is abnormal, without referring to the past inspection data.

As mentioned above, using the left-right symmetry of the aircraft 30 allows effective health evaluation of the aircraft structural objects 1B and 1C by the ultrasonic inspection system 4. That is, health evaluation of the respective aircraft structural objects 1B and 1C can be performed effectively by substantially comparing two detection signals of ultrasonic waves, obtained from the right and left symmetric aircraft structural objects 1B and 1C, with each other.

(Fourth Implementation)

Figure 11:
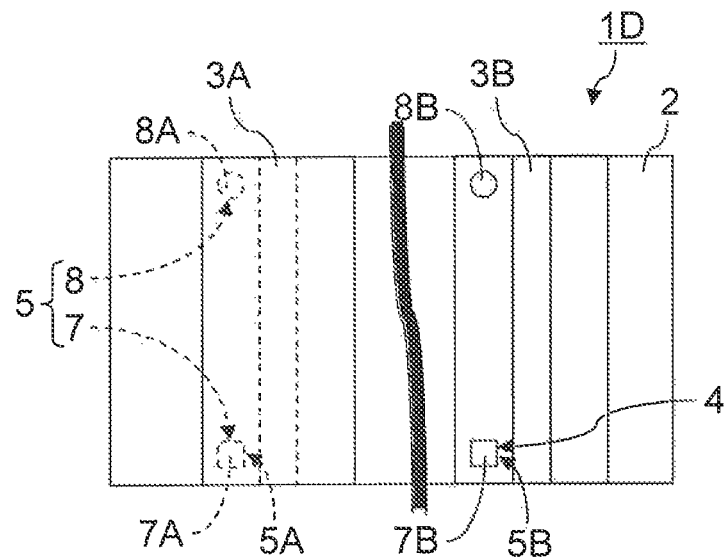
FIG. 11 is a front view showing a structure of an aircraft structural object including an ultrasonic inspection system according to the fourth implementation of the present invention.
Figure 12:
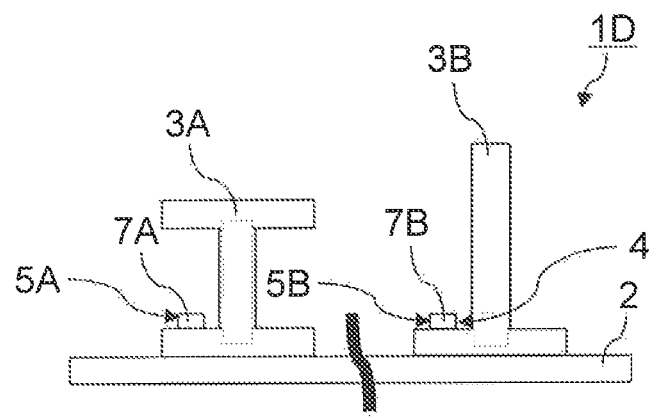
FIG. 12 is a bottom view of the aircraft structural object shown in FIG. 11.

FIG. 11 is a front view showing a structure of an aircraft structural object including an ultrasonic inspection system according to the fourth implementation of the present invention, and FIG. 12 is a bottom view of the aircraft structural object shown in FIG. 11.

In the fourth implementation, a structure of an aircraft structural object 1D to be inspected by the ultrasonic inspection system 4 differs from that in the first implementation. Since other features in the fourth implementation are similar to those in the first implementation, only the structure of the aircraft structural object 1D and the inspection units 5 are illustrated, and explanations about similar features are omitted.

The aircraft structural object 1D in the fourth implementation has a structure in which a plurality of stringers 3A and 3B are attached to the panel 2. The cross sectional shapes of the stringers 3A and 3B and heights of the stringers 3A and 3B from the panel 2 are different from each other. In the shown example, the first stringer 3A has an I-shaped cross section. Meanwhile, the second stringer 3B has an inverted T-shaped cross section. The height of the inverted T-shaped second stringer 3B is higher than that of the I-shaped first stringer 3A.

The inspection targets by the ultrasonic inspection system 4 are respective flanges of the stringers 3A and 3B which are bonded to the panel 2. Therefore, the first inspection unit 5A is disposed on one flange in the lower side of the first stringer 3A. Meanwhile, the second inspection unit 5B is disposed on one flange in the lower side of the second stringer 3B. As a matter of course, other inspection units 5 may be disposed on the other flanges in the lower side of the first stringer 3A and the second stringer 3B respectively.

When Lamb waves used as ultrasonic waves propagate platy portions of which thicknesses, widths and materials are the same as each other and distances between the actuators 7 and the ultrasonic sensors 8 are also the same as each other, propagation conditions of the Lamb waves can be considered to be the same as each other. Therefore, when the thicknesses, widths, and materials of the flanges of the stringers 3A and 3B are the same, propagation conditions of the Lamb waves can be made to be the same, regardless of the heights and cross sectional shapes of the stringers 3A and 3B, by making the distance between the first actuator 7A and the first ultrasonic sensor 8A be the same as the distance between the second actuator 7B and the second ultrasonic sensor 8B. Accordingly, even when the stringers 3A and 3B have different cross sectional forms and different heights as exemplified in FIG. 11 and FIG. 12, it can be considered that the structures of the flanges to be inspected are the same as each other as long as the distance between the first actuator 7A and the first ultrasonic sensor 8A is the same as the distance between the second actuator 7B and the second ultrasonic sensor 8B. This is also the same about not only the stringers 3A and 3B but also reinforcement members, such as other stringers, spars and frames.

In this case, the inspection units 5A and 5B obtain detection signals of Lamb waves from the platy inspection sections, consisting of the two flanges, of which propagation conditions of the Lamb waves are the same as each other, using the actuators 7A and 7B and the ultrasonic sensors 8A and 8B respectively disposed at the same interval. Then, an index value representing health of each flange can be calculated based on the detection signals of the ultrasonic waves consisting of the Lamb waves obtained from the two flanges. As a matter of course, index values representing health of three or more flanges can also be obtained using Lamb waves similarly.

Further, not only flanges but also webs of which thicknesses, widths, and materials are the same as each other may be set to inspection sections having the same structure, and a similar inspection using Lamb waves can be performed by disposing the actuators 7 and the ultrasonic sensors 8 so that respective intervals between the actuators 7 and the ultrasonic sensors 8 become the same as each other.

As mentioned above, using Lamb waves as ultrasonic waves allows health inspection with assuming that structures of inspection sections are the same as each other even when parts to be inspected have three dimensionally different structures as long as structures of portions to be inspected are the two dimensionally same as each other.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, health inspection of a desired structural object can be performed by the ultrasonic inspection system 4 as long as the structural object has inspection sections which can be considered to be the same as each other although cases where the aircraft structural objects 1A, 1B, 1C and 1D are inspected by the ultrasonic inspection system 4 respectively have been explained in the respective implementations mentioned above. In a case of a building, structures of stories can be considered to be the same as each other. In a case of a bridge, structures of segments in the longer direction can be considered to be the same as each other. In a case of a windmill, structures of blades can be considered to be the same as each other. Accordingly, health inspection by the ultrasonic inspection system 4 can be performed for various structural objects, such as a building, a bridge and a windmill.

What is claimed is:

1. An ultrasonic inspection system comprising:
a first inspection unit that acquires a detection signal of a first ultrasonic wave in a first inspection section of a structural object, using a first ultrasonic transducer and a first ultrasonic sensor;
a second inspection unit that acquires a detection signal of a second ultrasonic wave in a second inspection section of the structural object using a second ultrasonic transducer and a second ultrasonic sensor; and
a signal processing circuit that obtains the detection signal of the first inspection unit and the detection signal of the second inspection unit and determines an index value representing inspection information of at least one of the first inspection section and the second inspection section, based on the detection signal of the first ultrasonic wave and the detection signal of the second ultrasonic wave, and wherein the index value determination by the signal processing circuit is limited to common thickness, width and material composition demarcated regions in the structural object, with the first and second inspection sections representing two of said demarcated regions, and wherein the index value determination by the signal processing circuit is based only on detection signals generated from commonly spaced apart, along an axis transverse to a direction of the width, pairs of ultrasonic transducers and sensors, with said first and second ultrasonic transducers and sensors representing two of said spaced apart pairs, wherein the first and second inspection sections are plate form areas separated from each other by at least one wall surface of a stringer, a spar, a rib or a frame of the structural object, wherein the structural object is an aircraft structural object, and which at least one wall surface provides for demarcation into common width first and second inspection sections, and wherein the index value is a cross correlation coefficient, a root mean square error, a representative value of a difference signal, or a representative value of a division signal between the detection signals or between signals corresponding to the detection signals, and wherein the acquired detection signals of the first inspection unit and the second inspection unit include a first Lamb wave and a second Lamb wave, respectively, with an interval between the first ultrasonic transducer and the first ultrasonic sensor being the same as an interval between the second ultrasonic transducer and the second ultrasonic sensor, and each of the plate form areas of the first inspection section and the second inspection section being platy such that the first Lamb wave of the first inspection section and the second Lamb wave of the second inspection section pass through a common width and thickness platy section representing, respectively, the first and second inspection sections.

2. The ultrasonic inspection system according to claim 1, wherein the signal processing circuit is adapted to obtain the index value without referring to any of a past detection signal of an ultrasonic wave in the first inspection section and a past detection signal of an ultrasonic wave in the second inspection section.

3. The ultrasonic inspection system according to claim 2, further comprising:
a third inspection unit that acquires a detection signal of a third ultrasonic wave in a third inspection section of the structural object, using a third ultrasonic transducer and a third ultrasonic sensor, the third inspection section being another one of the demarcated regions;
wherein the signal processing circuit is adapted to obtain inspection information including the index value based on the detection signal of the first ultrasonic wave and the detection signal of the second ultrasonic wave, an index value based on the detection signal of the first ultrasonic wave and the detection signal of the third ultrasonic wave, and an index value based on the detection signal of the second ultrasonic wave and the detection signal of the third ultrasonic wave.

4. The ultrasonic inspection system according to claim 2, comprising:
at least four inspection units including the inspection units, the at least four inspection units respectively acquiring detection signals in inspection sections disposed two-dimensionally,
wherein the signal processing circuit is adapted to obtain index values, each of the index values being based on two detection signals acquired by two inspection units selected out of the at least four inspection units, a number of the index values being at least a number of combinations for selecting the two inspection units from the at least four inspection units.

5. The ultrasonic inspection system according to claim 1, further comprising:
a third inspection unit that acquires a detection signal of a third ultrasonic wave in a third inspection section of the structural object, using a third ultrasonic transducer and a third ultrasonic sensor, the third inspection section being another one of the demarcated regions;
wherein the signal processing circuit is adapted to obtain inspection information including the index value based on the detection signal of the first ultrasonic wave and the detection signal of the second ultrasonic wave, an index value based on the detection signal of the first ultrasonic wave and the detection signal of the third ultrasonic wave, and an index value based on the detection signal of the second ultrasonic wave and the detection signal of the third ultrasonic wave.

6. The ultrasonic inspection system according to claim 5, wherein the signal processing circuit is adapted to automatically detect an inspection section, in which a defect exists or the defect may exist, by detecting a singular value from the index values.

7. The ultrasonic inspection system according to claim 5, comprising:
at least four inspection units including the first and second inspection units, the at least four inspection units respectively acquiring detection signals in inspection sections disposed two-dimensionally,
wherein the signal processing circuit is adapted to obtain index values, each of the index values being based on two detection signals acquired by two inspection units selected out of the at least four inspection units, a number of the index values being at least a number of combinations for selecting the two inspection units from the at least four inspection units.

8. The ultrasonic inspection system according to claim 1, comprising:
at least four inspection units including the first and second inspection units, the at least four inspection units respectively acquiring detection signals in inspection sections disposed two-dimensionally,
wherein the signal processing circuit is adapted to obtain index values, each of the index values being based on two detection signals acquired by two inspection units selected out of the at least four inspection units, a number of the index values being at least a number of combinations for selecting the two inspection units from the at least four inspection units.

9. The ultrasonic inspection system according to claim 1, wherein the signal processing circuit is adapted to automatically detect an inspection section, in which a defect exists or the defect may exist, out of the first inspection section and the second inspection section, based on a temporal change of the index value.

10. An aircraft including the ultrasonic inspection system according to claim 1 as a part.

11. The ultrasonic inspection system according to claim 1, wherein said first ultrasonic transducer limits ultrasonic wave output to the direction of travel that is parallel with the direction of elongation of the at least one wall surface, and said second ultrasonic transducer limits ultrasonic wave output to a direction of travel that is also parallel with the direction of elongation of the at least one wall surface.

12. The ultrasonic inspection system according to claim 11, wherein the spaced apart pairs assume common relative positional locations within the respective first and second inspection sections.

13. The ultrasonic inspection system according to claim 1, wherein the spaced apart pairs assume common relative positional locations within the respective first and second inspection sections.

14. An ultrasonic inspection method comprising:
acquiring a detection signal of a first ultrasonic wave in a first inspection section of a structural object, using a first ultrasonic transducer and a first ultrasonic sensor;
acquiring a detection signal of a second ultrasonic wave in a second inspection section of the structural object, using a second ultrasonic transducer and a second ultrasonic sensor; and
obtaining in a signal processing circuit the detection signal of the first ultrasonic wave in the first inspection section and the detection signal of the second ultrasonic wave in the second inspection section, and
determining with the signal processing circuit an index value representing inspection information of at least one of the first inspection section and the second inspection section, and wherein the index value determination by the signal processing circuit is limited to common thickness, width and material composition demarcated regions in the structural object, with the first and second inspection sections representing two of said demarcated regions, and wherein the index value determination by the signal processing circuit is based only on detection signals generated from commonly spaced apart, along an axis transverse to a direction of the width, pairs of ultrasonic transducers and sensors, with said first and second ultrasonic transducers and sensors representing two of said spaced apart pairs,
wherein the first and second inspection sections are plate form areas separated from each other by at least one wall surface of a stringer, a spar, a rib or a frame of an aircraft structural object, and which at least one wall surface provides for demarcation into common width first and second inspection sections, and
wherein the first and second inspection sections are plate form areas separated from each other by at least one wall surface of a stringer, a spar, a rib or a frame of the structural object, wherein the structural object is an aircraft structural object, and which at least one wall surface provides for demarcation into common width first and second inspection sections, and
wherein the acquired detection signals of the first inspection unit and the second inspection unit include a first Lamb wave and a second Lamb wave, respectively, with an interval between the first ultrasonic transducer and the first ultrasonic sensor being the same as an interval between the second ultrasonic transducer and the second ultrasonic sensor, and each of the plate form areas of the first inspection section and the second inspection section being platy such that the first Lamb wave of the first inspection section and the second Lamb wave of the second inspection section pass through a common width and thickness platy section representing, respectively, the first and second inspection sections.

15. An ultrasonic inspection system comprising:
a first inspection unit that acquires a detection signal of a first ultrasonic wave in a first inspection section of a first aircraft structural object, using a first ultrasonic transducer and a first ultrasonic sensor;
a second inspection unit that acquires a detection signal of a second ultrasonic wave in a second inspection section of a second aircraft structural object, and the second inspection unit using a second ultrasonic transducer and a second ultrasonic sensor; and
a signal processing circuit that obtains the detection signal of the first inspection unit and the detection signal of the second inspection unit and determines an index value representing inspection information of at least one of the first inspection section and the second inspection section, based on the detection signal of the first ultrasonic wave and the detection signal of the second ultrasonic wave, wherein the signal processing circuit is adapted to obtain the index value without referring to any of a past detection signal of an ultrasonic wave in the first inspection section and a past detection signal of an ultrasonic wave in the second inspection section,
wherein the first inspection section is in the first aircraft structural object included in an aircraft, and
the second inspection section is in the second aircraft structural object disposed at a position symmetric to a position of the first aircraft structural object with respect to a center of an airframe of the aircraft, the second aircraft structural object having a structure symmetric to a structure of the first aircraft structural object with respect to the center of the airframe,
wherein the first and second inspection sections are plate form areas defined, at least in part, by respective demarcating wall surfaces of a stringer, a spar, a rib or a frame of each of the first and second aircraft structural objects, and which plate form areas are positioned to opposite sides of the center of the airframe as to define commonly configured demarcated regions for the first and second inspection sections, and
wherein the index value is a cross correlation coefficient, a root mean square error, a representative value of a difference signal, or a representative value of a division signal between the detection signals or between signals corresponding to the detection signals, and wherein
the acquired detection signals of the first inspection unit and the second inspection unit include a first Lamb wave and a second Lamb wave, respectively, with an interval between the first ultrasonic transducer and the first ultrasonic sensor being same as an interval between the second ultrasonic transducer and the second ultrasonic sensor, and each of the plate form areas of the first inspection section and the second inspection section being platy such that the first Lamb wave of the first inspection section and the second Lamb wave of the second inspection section pass through a common width and thickness platy section representing, respectively, the first and second inspection sections.

16. The ultrasonic inspection system according to claim 15, wherein the first aircraft structural object is a left wing of the aircraft and the second aircraft structural object is a right wing of the aircraft.

17. The ultrasonic inspection system according to claim 15, wherein the index value determination by the signal processing circuit is limited to common thickness, demarcated width, and material composition regions in the first and second aircraft structural objects.

* * * * *